United States Patent [19]

Tanimoto et al.

[11] Patent Number: 6,069,697
[45] Date of Patent: May 30, 2000

[54] OPTICAL TRANSMISSION CHARACTERISTIC MEASURING APPARATUS AND CALIBRATION METHOD USING THE SAME

[75] Inventors: Takao Tanimoto, Hadano; Hiroaki Endo, Yokohama; Hiroaki Ohtateme, Atsugi; Muneo Ishiwata, Minamiashigara; Yasuaki Nagashima, Atsugi, all of Japan

[73] Assignee: Anritsu Corporation, Tokyo, Japan

[21] Appl. No.: 09/062,484

[22] Filed: Apr. 17, 1998

[30] Foreign Application Priority Data

Apr. 30, 1997 [JP] Japan .................................. 9-112076

[51] Int. Cl.[7] ........................................ G01J 3/28
[52] U.S. Cl. ................................................. 356/327
[58] Field of Search ............................ 356/327, 364–369, 356/370, 326, 330–334, 328, 432–444, 73.1, 318, 417, 317; 250/237 G, 236, 573–577, 339.09, 343–346, 373, 458.1, 459.1, 461.1, 461.2, 227.11–227.32, 225; 388/12, 13

[56] References Cited

U.S. PATENT DOCUMENTS

| 4,957,366 | 9/1990 | Koshi et al. . |
| 5,796,096 | 8/1998 | Rakuljic et al. . |
| 5,828,061 | 10/1998 | Kakimoto . |

FOREIGN PATENT DOCUMENTS

| 0 212 804 A2 | 3/1987 | European Pat. Off. . |
| 0 330 183 A2 | 8/1989 | European Pat. Off. . |
| 0 548 935 A1 | 6/1993 | European Pat. Off. . |
| 405126641 | 5/1993 | Japan . |

OTHER PUBLICATIONS

Patent Abstracts of Japan, vol. 9, No. 210, (P–383), Aug. 28, 1985, ie,Jp 60 070335 A (Nippon Denshin Denwa Kosha;others: 01) Apr. 22, 1985 *abstract* only.

*Primary Examiner*—K. P. Hantis
*Attorney, Agent, or Firm*—Frishauf, Holtz, Goodman, Langer & Chick, P.C.

[57] ABSTRACT

A processing unit reads out, from a memory, wavelength setting data corresponding to wavelength information from a key input section, and outputs a wavelength setting command corresponding to the wavelength setting data to a tunable-wavelength control section and a spectral wavelength control section. The tunable-wavelength control section controls a tunable-wavelength light source section to output a laser beam having a wavelength corresponding to the wavelength setting data. The spectral wavelength control section controls a spectroscope section to perform spectroscopy of the light having the wavelength corresponding to the wavelength setting data and output the resultant light. Output light from the tunable-wavelength light source section whose wavelength has been set is input to an object to be measured. Light passing through the object is input to the spectroscope section. The spectroscope section performs spectroscopy of only the light having the wavelength corresponding to the wavelength setting data. A light-receiving section receives the spectral light and photoelectrically converts it. The resultant light is converted into digital data by an A/D conversion section to be input as level data to a processing unit. The processing unit obtains a light-reception level on the basis of the digital level data.

11 Claims, 7 Drawing Sheets

OPTICAL TRANSMISSION CHARACTERISTIC MEASURING APPARATUS AND CALIBRATION METHOD USING THE SAME

BACKGROUND OF THE INVENTION

The present invention relates to an optical transmission characteristic measuring apparatus for implementing wide dynamic range measurement of the wavelength gain characteristics of optical devices such as semiconductor optical amplifiers and optical fiber amplifiers, the wavelength loss characteristics of fiber gratings, waveguide type gratings, and other types of filters, and the like, and a calibration method using the measuring apparatus.

Conventionally, the optical transmission characteristics of an optical device, e.g., the gain characteristics of an optical fiber amplifier or the loss characteristics of a bandpass filter for extracting a specific wavelength in wavelength division multiplexing (WDM) communication have been measured by one of the following methods:

(1) inputting output light from a wideband light source such as a white light source or SLD (Super Luminescent Diode) to the optical device, and inputting output light from the optical device to an optical spectrum analyzer, thereby measuring the characteristics; and (2) changing the wavelength of a tunable-wavelength light source in certain steps within the bandwidth, inputting output light from the light source to the optical device, and measuring the output light level of the optical device for each wavelength with an optical power meter.

The following problems are, however, posed in implementing wide dynamic range measurement of wavelength loss/gain characteristics by the above methods.

Method (1) demands a wideband light source having a very high power or an optical spectrum analyzer having a very high sensitivity and wide dynamic range.

Method (2) demands a tunable-wavelength light source with a very high side mode suppression ratio (SMSR). With the state-of-the-art method, the limit of noise at the peak is 50 dB.

BRIEF SUMMARY OF THE INVENTION

The present invention has been made in consideration of the above situation to solve the above problems, and has as its object to provide an optical transmission characteristic measuring apparatus which can implement wide dynamic range measurement of optical transmission characteristics such as wavelength loss/gain characteristics by using a tunable-wavelength light source and a spectroscope and maximizing their advantages by operating them at the same wavelength.

In order to achieve the above object, according to the first aspect of the present invention, there is provided an optical transmission characteristic measuring apparatus for measuring optical transmission characteristics of an object to be measured, comprising:

a tunable-wavelength light source unit which can set a wavelength of output light in accordance with a first wavelength setting signal and inputs the output light to the object;

a spectroscope unit which can set a selected wavelength in accordance with a second wavelength setting signal and performs spectroscopy of light passing through the object; and a processing unit for setting the wavelength of the output light from the tunable-wavelength light source section and the selected wavelength of the spectroscope unit to an equal wavelength by performing tuning control on the first wavelength setting signal and the second wavelength setting signal, thereby obtaining optical transmission characteristics of the object from an output signal from the spectroscope unit.

According to the second aspect of the present invention, there is provided a calibration method using above optical transmission characteristic measuring apparatus, comprising the steps of:

setting a wavelength of output light from the tunable-wavelength light source unit;

obtaining a wavelength at a peak level of the wavelength having undergone spectroscopy in the spectroscope unit by wavelength-sweeping the spectroscope unit in a wavelength range including the set wavelength;

causing the processing unit to obtain a wavelength difference between the set wavelength of the tunable-wavelength light source unit and the wavelength at the peak level;

causing the processing unit to obtain wavelength difference data of one of the tunable-wavelength light source unit and the spectroscope unit which corresponds to the wavelength difference;

causing the processing unit to calibrate current wavelength setting data with the wavelength difference data; and wavelength-tuning the tunable-wavelength light source unit and the spectroscope unit by performing a wavelength tuning process using the processing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Figure 1:
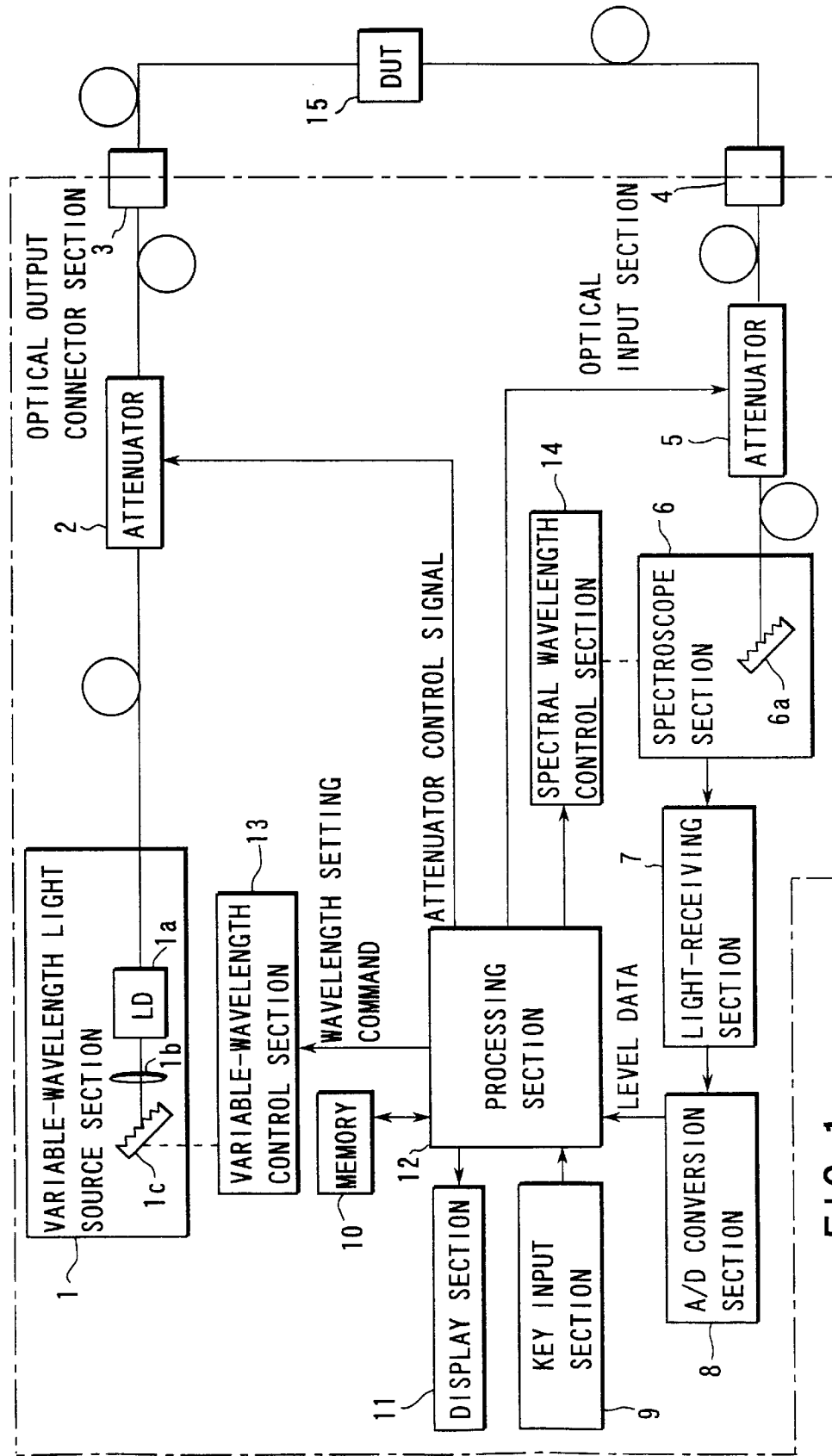
FIG. 1 is a block diagram showing an optical transmission characteristic measuring apparatus according to the first embodiment of the present invention.

Reference will now be made in detail to the presently preferred embodiments of the invention as illustrated in the accompanying drawings, in which like reference characters designate like or corresponding parts throughout the several drawings.

An outline of the present invention will be described first. In order to obtain the above object, according to the present invention, there is provided an optical transmission characteristic measuring apparatus (1) characterized by comprising:

an input section 9 for inputting wavelength information including a measurement wavelength range and a calibration wavelength;

a tunable-wavelength light source section 1 for outputting light controlled to have a predetermined wavelength;

a tunable-wavelength control section 13 for variably controlling the wavelength of light output from the tunable-wavelength light source section on the basis of the wavelength information input from the input section;

an optical output section 3 for inputting output light from the tunable-wavelength light source section to an object to be measured;

an optical input section 4 for inputting light having passed through the object;

a spectroscope section 6 for receiving the input light from the optical input section, performing spectroscopy for only light having a predetermined. wavelength, and outputting the resultant light;

a spectral wavelength control section 14 for variably controlling the wavelength to be subjected to spectroscopy in the spectroscope section on the basis of the wavelength information input from the input section;

a light-receiving section 7 for receiving the light from the spectroscope section and photoelectrically converting the light;

an A/D conversion section 8 for converting the signal obtained by photoelectric conversion in the light-receiving section into a digital signal; and a processing section 12 for wavelength-tuning the tunable-wavelength light source section and the spectroscope section to the same wavelength, and obtaining a light-reception level from the digital signal obtained by A/D conversion.

An optical transmission characteristic measuring apparatus (2) according to the present invention is characterized by comprising a reference wavelength light source 22 for outputting light having a known wavelength in the above optical transmission characteristic measuring apparatus (1), and also having an optical path switching means 24 incorporated in a housing to switch output light beams from the reference wavelength light source 22 and the tunable-wavelength light source section 1.

An optical transmission characteristic measuring apparatus (3) according to the present invention is characterized by comprising a polarization control section 21 arranged between the tunable-wavelength light.source section 1 and the optical output section 3 to change the polarized state of output light from the tunable-wavelength light source section in the above optical transmission characteristic measuring apparatus (1).

A calibration method (4) using an optical transmission characteristic measuring apparatus according to the present invention is a method using one of the above optical transmission characteristic measuring apparatuses (1) to (3), characterized by wavelength-tuning the tunable-wavelength light source section and the spectroscope section by performing wavelength tuning processing including:

the step of setting the wavelength of output light from the tunable-wavelength light source section 1;

the step of obtaining a wavelength at the peak level of light having undergone spectroscopy in the spectroscope section 6 by wavelength-sweeping the spectroscope section in a wavelength range including the set wavelength;

the step of obtaining the wavelength difference between the set wavelength of the tunable-wavelength light source section and the wavelength at the peak level;

the step of obtaining wavelength difference data, of the tunable-wavelength light source section or the spectroscope section, which corresponds to the wavelength difference; and the step of correcting the current wavelength setting data in accordance with the wavelength difference data.

A calibration method (5) using an optical transmission characteristic measuring apparatus according to the present invention is a method using the above optical transmission characteristic measuring apparatus (2) or (3), characterized by including, in the calibration method (4) using the optical transmission characteristic measuring apparatus, the step of inputting output light from the reference wavelength light source 22 to the optical input section 4, and wavelength-sweeping the spectroscope section 6 in a wavelength range including the wavelength of the reference wavelength light source, thereby obtaining a wavelength at the peak level of the light having undergone spectroscopy in the spectroscope section;

the step of obtaining the wavelength difference between the wavelength at the peak level and the wavelength of the reference wavelength light source;

the step of obtaining wavelength difference data, of the spectroscope section 6, which corresponds to the wavelength difference; and the step of correcting the current wavelength setting data in accordance with the wavelength difference data.

A calibration method (6) using an optical transmission characteristic measuring apparatus according to the present invention is a method using the above optical transmission characteristic measuring apparatus (2) or (3), characterized by including, in the calibration method (4) or (5) using the above optical transmission characteristic measuring. apparatus, the step of inputting output light having a known level from the reference wavelength light source 22 to the optical input section 4 and obtaining the output light having undergone spectroscopy in the spectroscope section 6;

the step of obtaining the difference between the level of the output light from the spectroscope section 6 and the level of the reference wavelength light source; and the step of correcting the level of the output light from the tunable-wavelength light source section 1 to cancel out the level difference.

The embodiments of the present invention, based on the above outline, will be described next with reference to the several views of the accompanying drawing.

An optical transmission characteristic measuring apparatus according to the first embodiment of the present invention will be described first.

FIG. 1 is a block diagram showing the optical transmission characteristic measuring apparatus according to the first embodiment of the present invention.

As shown in FIG. 1, the optical transmission characteristic measuring apparatus according to the first embodiment of the present invention is mainly constituted by a tunable-wavelength light source section 1, a first attenuator 2, an optical output connector section 3, an optical input connector section 4, a second attenuator 5, a spectroscope section 6, a light-receiving section 7, an A/D conversion section 8, a key input section 9, a memory (storage section) 10, a display section 11, a processing section 12, a tunable-wavelength control section 13, and a spectral wavelength control section 14.

The tunable-wavelength light source section 1 is of an external resonance type, which includes a semiconductor laser element 1a, a lens 1b, and a diffraction grating 1c and oscillates/outputs a laser beam upon selection of an arbitrary wavelength.

The semiconductor laser element 1a is driven by a constant active layer current.

The lens 1b collimates the laser beam output from an antireflection coat on one end of the semiconductor laser element 1a.

The diffraction grating 1c is pivoted by a pivoting unit (not shown) to select a wavelength in accordance with a control signal from the tunable-wavelength control section 13. The diffraction grating 1c receives the collimated light from the lens 1b and returns only light having the selected wavelength to the semiconductor laser element 1a.

In this case, the angle of the diffraction grating 1c is set in accordance with the wavelength information input by the operator with the key input section 9.

The output light level of the semiconductor laser element 1a is changed by a control signal from the processing section 12.

The first attenuator 2 as a level changing section is connected between the tunable-wavelength light source section 1 and the optical output connector section 3 through, for example, an optical fiber to adjust the level of output light from the tunable-wavelength light source section 1. With this arrangement, the first attenuator 2 changes the level of output light from the tunable-wavelength light source section 1 in accordance with a control signal from the processing section 12.

The optical output connector section 3 as an optical output section is mounted on the housing surface on the subsequent stage of the first attenuator 2.

When the input terminal of an object (optical device: DUT) 15 to be measured is detachably connected to the optical output connector section 3, output light from the first attenuator 2 is input to the object 15.

The optical input connector section 4 as an optical input section is juxtaposed with the optical output connector section 3 with respect to the housing surface.

When the output terminal of the object 15 is detachably connected to the optical input connector section 4, light passing through the object 15 is input to the optical input connector section 4.

The second attenuator 5 as a level changing section is connected between the optical input connector section 4 and the spectroscope section 6 through, for example, an optical fiber to prevent an excessive input of output light from the object 15. With this arrangement, the second attenuator 5 changes the level of input light from the optical input connector section 4 in accordance with a control signal from the processing section 12.

The spectroscope section 6 is constituted by a dispersive spectroscope such as a Littrow spectroscope or Czerny-Turner spectroscope using a diffraction grating 6a.

The spectroscope section 6 outputs only light, of input light from the second attenuator 5, which has the same wavelength as that of the tunable-wavelength light source section 1 to the light-receiving section 7 upon spectroscopy by changing the angle of the diffraction grating 6a in accordance with a control signal from the spectral wavelength control section 14.

The light-receiving section 7 receives light from the spectroscope section 6, photoelectrically converts the received light, and outputs the resultant signal to the A/D conversion section 8.

The A/D conversion section 8 converts the signal obtained by the light-receiving section 7 upon photoelectric conversion into a digital signal, and outputs the digital signal as level data to the processing section 12.

The key input section 9 as an input section serves to input various measurement conditions upon key input operation of the operator. Information about such various measurement conditions is input to the processing section 12.

More specifically, wavelength information representing a measurement wavelength/measurement wavelength range and a level scale for displaying a measurement level are input from the key input section 9 upon key input operation of the operator.

The key input section 9 can input mode information for designating one of the following modes, upon key input operation of the operator: a measurement mode of measuring the object 15; a wavelength tuning mode of performing a wavelength tuning process; a wavelength calibration mode of performing a wavelength calibration process; and a level calibration mode of performing a level calibration process.

Furthermore, the key input section 9 can input various pieces of parameter information for measurement level analysis in the processing section 12 upon key input operation of the operator.

Angle data (corresponding to the rotational angles of the diffraction gratings) about the wavelengths of light beams from the tunable-wavelength light source section 1 and the spectroscope section 6 are stored in the memory 10 as a storage means in advance.

Receiving wavelength information from the key input section 9 upon key input operation of the operator, the processing section 12 reads out wavelength setting data based on this wavelength information from the memory 10, and outputs a wavelength setting command corresponding to the read wavelength setting data to the tunable-wavelength control section 13 and the spectral wavelength control section 14.

The processing section 12 also obtains a light-reception level on the basis of level data from the A/D conversion section 8.

In addition, the processing section 12 can perform the following processes to be described later: a wavelength tuning process, a wavelength calibration process, a level calibration process, control on the attenuators 2 and 5, a process of displaying an obtained light-reception level on the screen of the display section 11, analysis of a measurement level, and the like on the basis of pieces of input information (wavelength information, mode information, and various pieces of parameter information) input from the key input section 9 upon key input operation of the operator, level data from the A/D conversion section 8, and the data stored in the memory 10.

The tunable-wavelength control section 13 outputs a control signal corresponding to a wavelength setting command from the processing section 12 to control the angle of the diffraction grating 1c so as to cause the semiconductor laser element 1a of the tunable-wavelength light source section 1 to output light having the set wavelength.

The spectral wavelength control section 14 outputs a control signal corresponding to a wavelength setting command from the processing section 12 to control the spectroscope section 6 (more specifically, the angle of the diffraction grating) so as to cause the spectroscope section 6 to perform spectroscopy of light having the set wavelength and output the resultant light to the light-receiving section 7.

In the optical transmission characteristic measuring apparatus having the above arrangement, after the object 15 is connected to the optical output connector section 3 and the optical input connector section 4, and the power supply is turned on, a measurement mode is designated, and wavelength information is input upon key input operation of the operator with respect to the key input section 9.

The processing section 12 reads out wavelength setting data from the memory 10 on the basis of this wavelength information, and outputs a wavelength setting command corresponding to the read wavelength setting data to the tunable-wavelength control section 13 and the spectral wavelength control section 14.

With these operations, the tunable-wavelength control section 13 variably controls the angle of the diffraction grating 1c to cause the semiconductor laser element 1a of the tunable-wavelength light source section 1 to output a laser beam having a wavelength corresponding to the wavelength setting data.

The spectral wavelength control section 14 controls the spectroscope section 6 to perform spectroscopy of light having a wavelength corresponding to wavelength setting data and output the resultant light to the light-receiving section 7.

In this state, output light from the tunable-wavelength light source section 1 having undergone wavelength setting is input to the object 15 through the optical output connector section 3.

Light passing through the object 15 is input to the spectroscope section 6 through the optical input connector section 4.

The spectroscope section 6 performs spectroscopy of only light having the wavelength corresponding to the wavelength setting data and outputs the resultant light to the light-receiving section 7.

The light-receiving section 7 receives the light having undergone spectroscopy in the spectroscope section 6 and photoelectrically converts the light.

The signal obtained by the light-receiving section 7 upon photoelectric conversion is converted into digital data by the A/D conversion section 8 and input to the processing section 12.

The processing section 12 obtains a light-reception level on the basis of the level data obtained by the A/D conversion section 8 upon digital conversion.

The above operation is executed throughout the measurement wavelength range input by the operator with the key input section 9.

When the wavelength tuning mode is designated by the operator with the key input section 9 in executing the above operation, a wavelength tuning processing is performed to eliminate the wavelength difference between the wavelength of the tunable-wavelength light source section 1 and the wavelength of the spectroscope section 6.

This wavelength tuning process will be described below with reference to the flow chart of FIG. 2.

First of all, the optical output connector section 3 and the optical input connector section 4 are connected to each other through a short fiber to be short-circuited (step ST1).

In this state, when the wavelength tuning mode is designated by the operator with the key input section 9, the processing section 12 loads the current wavelength setting data from the memory 10 (step ST2).

Upon reception of a wavelength setting command corresponding to the loaded wavelength setting data from the processing section 12, the tunable-wavelength control section 13 outputs a control signal to control the angle of the diffraction grating 1c of the tunable-wavelength light source section 1.

With this operation, the tunable-wavelength light source section 1 is set to a wavelength $\lambda(n)$ (step ST3).

Upon reception of the wavelength setting command corresponding to the wavelength setting data from the processing section 12, the spectral wavelength control section 14 wavelength-sweeps the spectroscope section 6 in a wavelength range including the set wavelength $\lambda(n)$ (step ST4).

The processing section 12 obtains a wavelength $\lambda p(n)$ at the peak level of the spectroscope section 6 from the level data at each wavelength which is output through the light-receiving section 7 and A/D conversion section 8 upon sweeping (step ST5).

The processing section 12 obtains a wavelength difference $\Delta\lambda(n)$ between the set wavelength $\lambda(n)$ of the tunable-wavelength light source section 1 and the wavelength $\lambda p(n)$ at the peak level of the spectroscope section 6 (step ST6).

The above operation is repeated until a wavelength difference at a predetermined wavelength required in the wavelength tuning process is detected.

When the wavelength difference at the predetermined wavelength required in the wavelength tuning process is detected (step ST7), the processing section 12 obtains wavelength difference data $\Delta K(\lambda)$ of the tunable-wavelength light source section 1 or the spectroscope section 6 from the detected wavelength difference $\Delta\lambda(n)$.

The processing section 12 obtains new wavelength setting data by subtracting the obtained wavelength difference data $\Delta K(\lambda)$ from the current wavelength setting data (step ST8), and then stores the new wavelength setting data in the memory 10 (step ST9).

Subsequently, by setting this new wavelength setting data, the wavelength of the tunable-wavelength light source section 1 and the wavelength of the spectroscope section 6 are automatically tuned.

An optical transmission characteristic measuring apparatus according to the second embodiment of the present invention will be described next.

Figure 3:
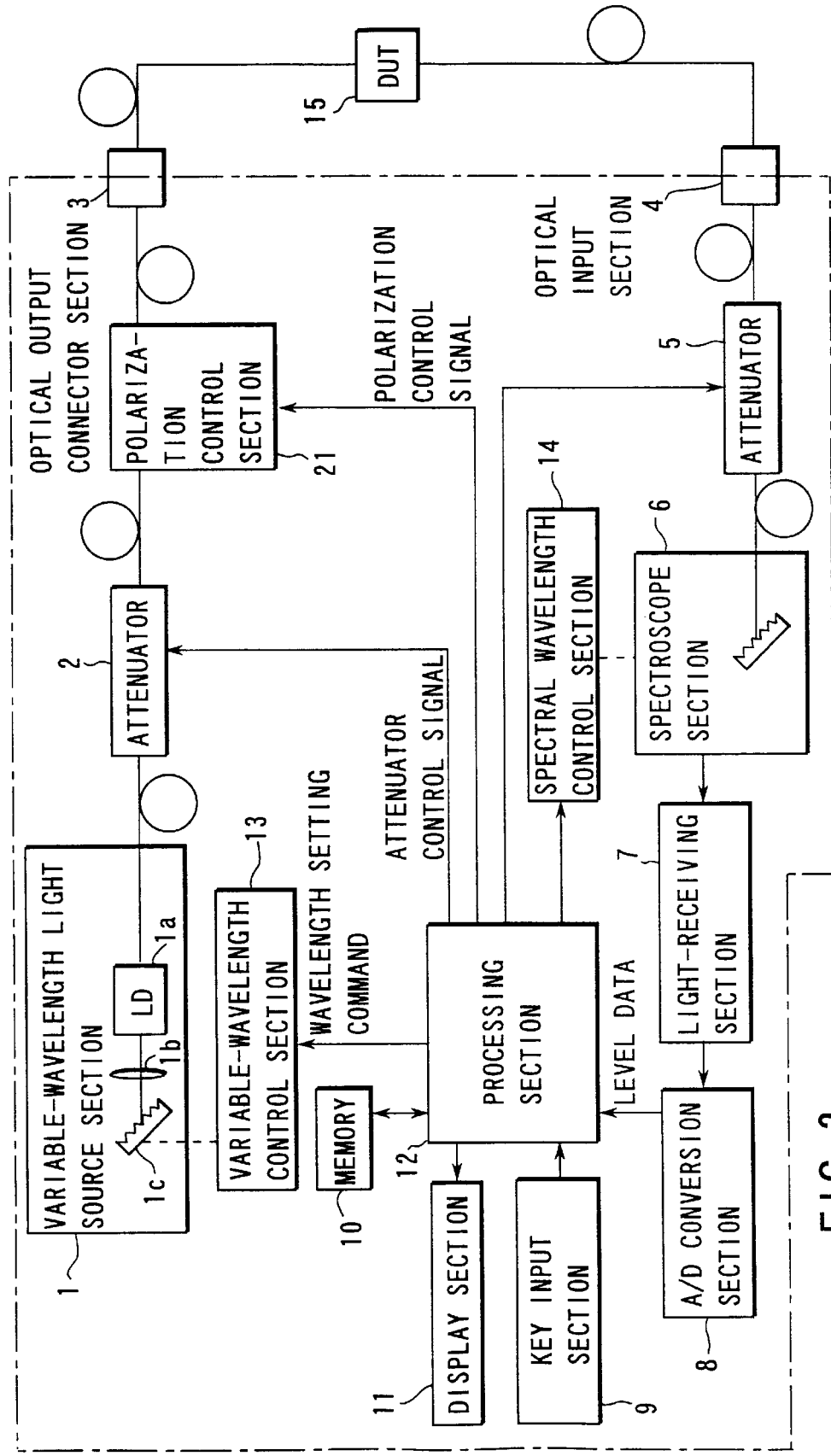
FIG. 3 is a block diagram showing an optical transmission characteristic measuring apparatus according to the second embodiment of the present invention.

FIG. 3 is a block diagram showing the optical transmission characteristic measuring apparatus according to the second embodiment of the present invention.

The same reference numerals in the second embodiment denote the same constituent elements as in the first embodiment, and a description thereof will be omitted.

As shown in FIG. 3, the optical transmission characteristic measuring apparatus according to the second embodiment includes a polarization control section 21 between an optical output connector section 3 and a first attenuator 2, in addition to the arrangement of the first embodiment.

The polarization control section 21 changes the polarized state of light output from the optical output connector section 3 in accordance with a polarization control command output from a processing section 12 upon reception of polarization control information input by the operator with a key input section 9.

As this polarization control section 21, a bulk type polarization control section using a wavelength plate or a fiber loop type polarization control section is used.

With the use of the bulk type polarization control section 21, a desired polarized state can be obtained by a combination of $\lambda/2$ and $\lambda/4$ plates.

With the use of the fiber loop type polarization control section 21, the polarized state of light can be changed to a desired polarized state by shifting the phase by moving the loop portion of the fiber.

According to the optical transmission characteristic measuring apparatus of the second embodiment, therefore, the polarized state of output light from the tunable-wavelength light source section 1 can be changed to an arbitrary polarized state by the polarization control section 21, and hence wavelength loss characteristics in arbitrary polarization can be measured.

With this operation, wavelength loss/gain characteristics in polarization caused by an object 15 can be estimated.

An optical transmission characteristic measuring apparatus according to the third embodiment of the present invention will be described next.

Figure 4:
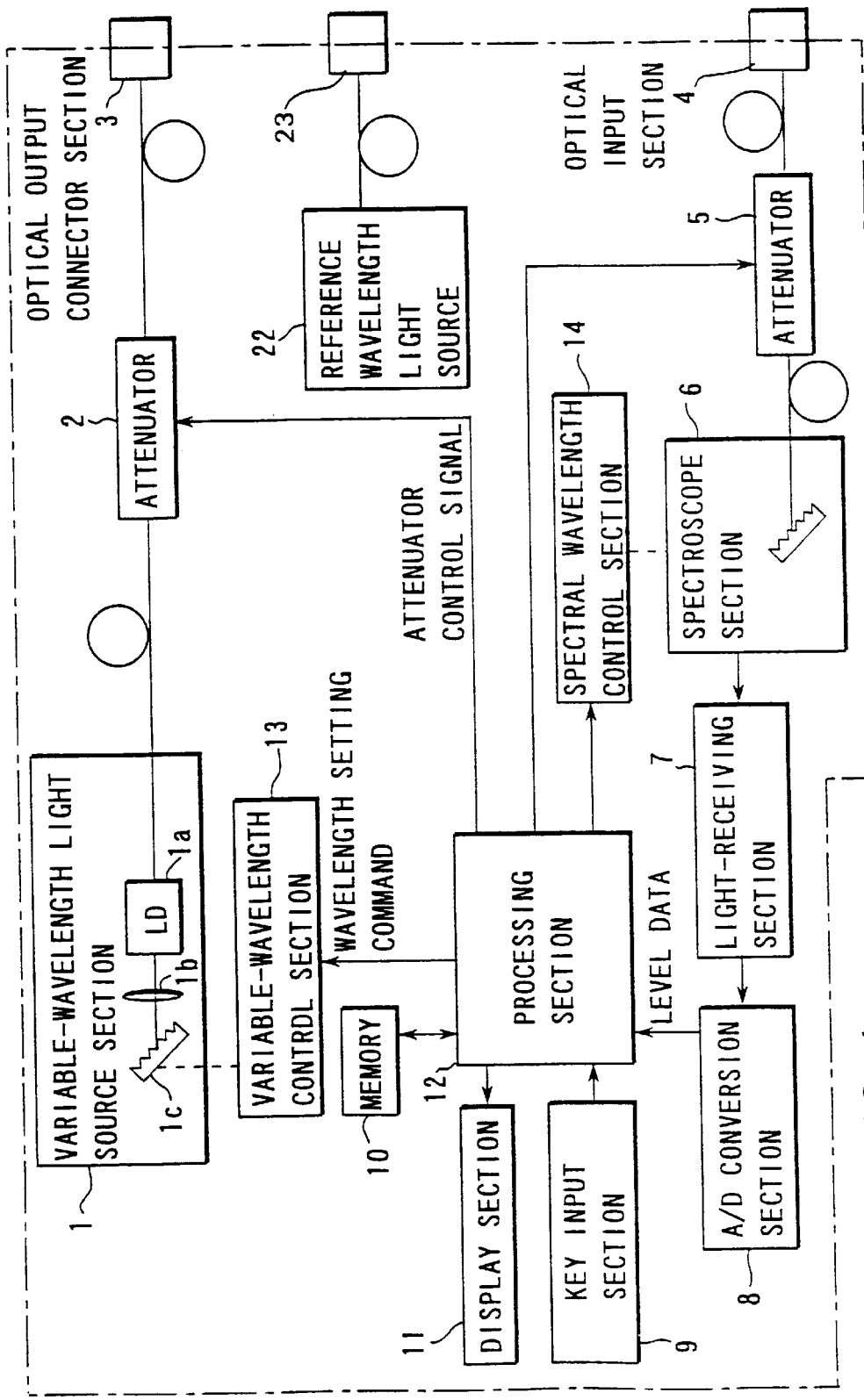
FIG. 4 is a block diagram showing an optical transmission characteristic measuring apparatus according to the third embodiment of the present invention.

FIG. 4 is a block diagram showing the optical transmission characteristic measuring apparatus according to the third embodiment of the present invention.

The same reference numerals in the third embodiment denote the same constituent elements as in the first embodiment, and a description thereof will be omitted.

As shown in FIG. 4, the optical transmission characteristic measuring apparatus of the third embodiment includes a reference wavelength light source 22 in addition to the arrangement of the first embodiment.

The reference wavelength light source 22 outputs light of a predetermined level based on a predetermined reference wavelength $\lambda$ref. The reference wavelength light source 22 includes an optical output connector section 23 as an optical output section and is arranged in the housing.

Figure 5:
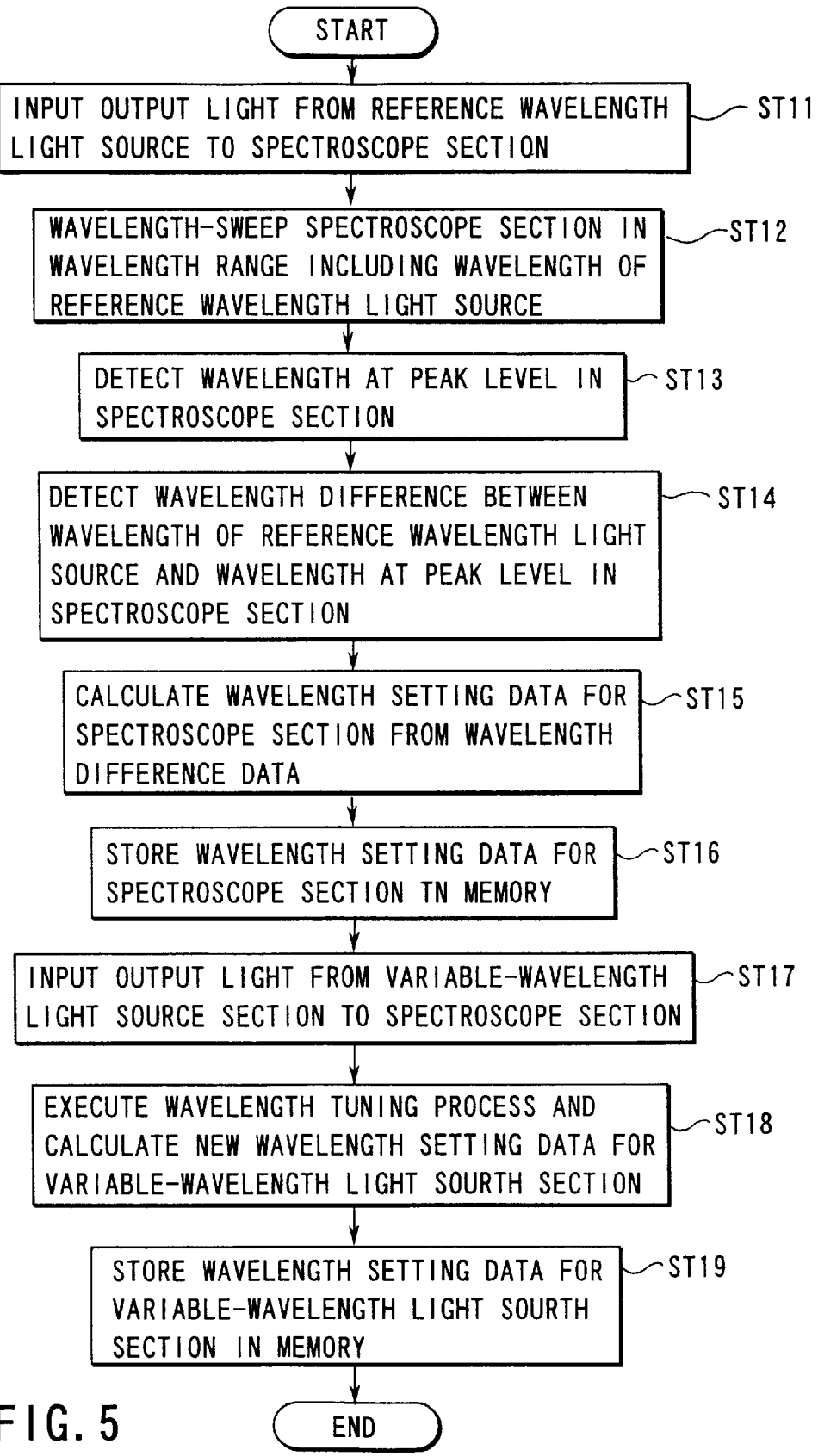
FIG. 5 is a flow chart showing a calibration process using the optical transmission characteristic measuring apparatus of the present invention.

This reference wavelength light source 22 is used in the processing section 12 when a wavelength calibration process based on the flow chart of FIG. 5 is executed.

This wavelength calibration process will be described below with reference to FIG. 5.

First of all, the optical output connector section 23 of the reference wavelength light source 22 is connected to an optical input connector section 4 through a short fiber.

In this state, when the wavelength calibration mode is designated by the operator with a key input section 9, output light from the reference wavelength light source 22 is input to a spectroscope section 6 through the two connector sections 23 and 4 (step ST11).

Upon reception of a wavelength setting command corresponding to wavelength setting data from a processing section 12, a spectral wavelength control section 14 wavelength-sweeps the spectroscope section 6 in a wavelength range including the referenced wavelength $\lambda$ref of the reference wavelength light source 22 (step ST12).

The processing section 12 obtains a wavelength at the peak level in the spectroscope section 6 at each wavelength upon sweep operation (step ST13).

The processing section 12 then obtains a wavelength difference $\Delta\lambda$ between an obtained wavelength $\lambda$p at the peak level and the reference wavelength $\lambda$ref of the reference wavelength light source 22 (step ST14).

In addition, the processing section 12 obtains wavelength difference data $\Delta K$ about the spectroscope section 6 which corresponds to the obtained wavelength difference $\Delta\lambda$ (step ST15).

The processing section 12 corrects the current wavelength setting data with the wavelength difference data $\Delta K$, and stores the corrected wavelength setting data in a memory 10 (step ST16).

Figure 2:
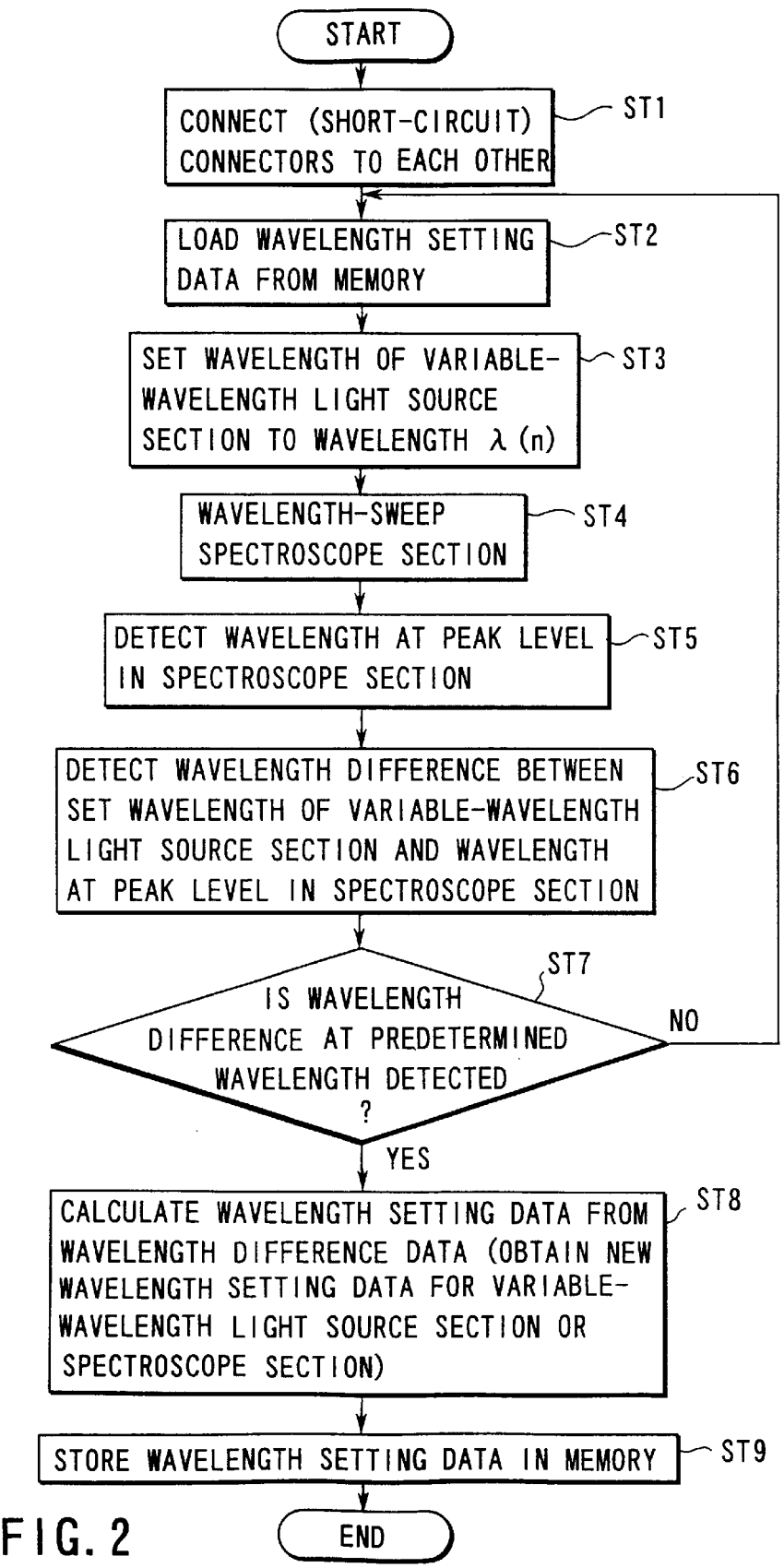
FIG. 2 is a flow chart showing a wavelength tuning process using the optical transmission characteristic measuring apparatus of the present invention.

Subsequently, the wavelength tuning process shown in FIG. 2 is executed.

The processing section 12 inputs output light from a tunable-wavelength light source section 1 to the spectroscope section 6 (step ST17), and obtains new wavelength setting data of the tunable-wavelength light source section 1 (step ST18). Thereafter, the processing section 12 stores this wavelength setting data in the memory 10 (step ST19).

By executing the above wavelength calibration process, the wavelength precision can be improved, and optical transmission characteristics can be measured.

An optical transmission characteristic measuring apparatus according to the fourth embodiment of the present invention will be described next.

Figure 6:
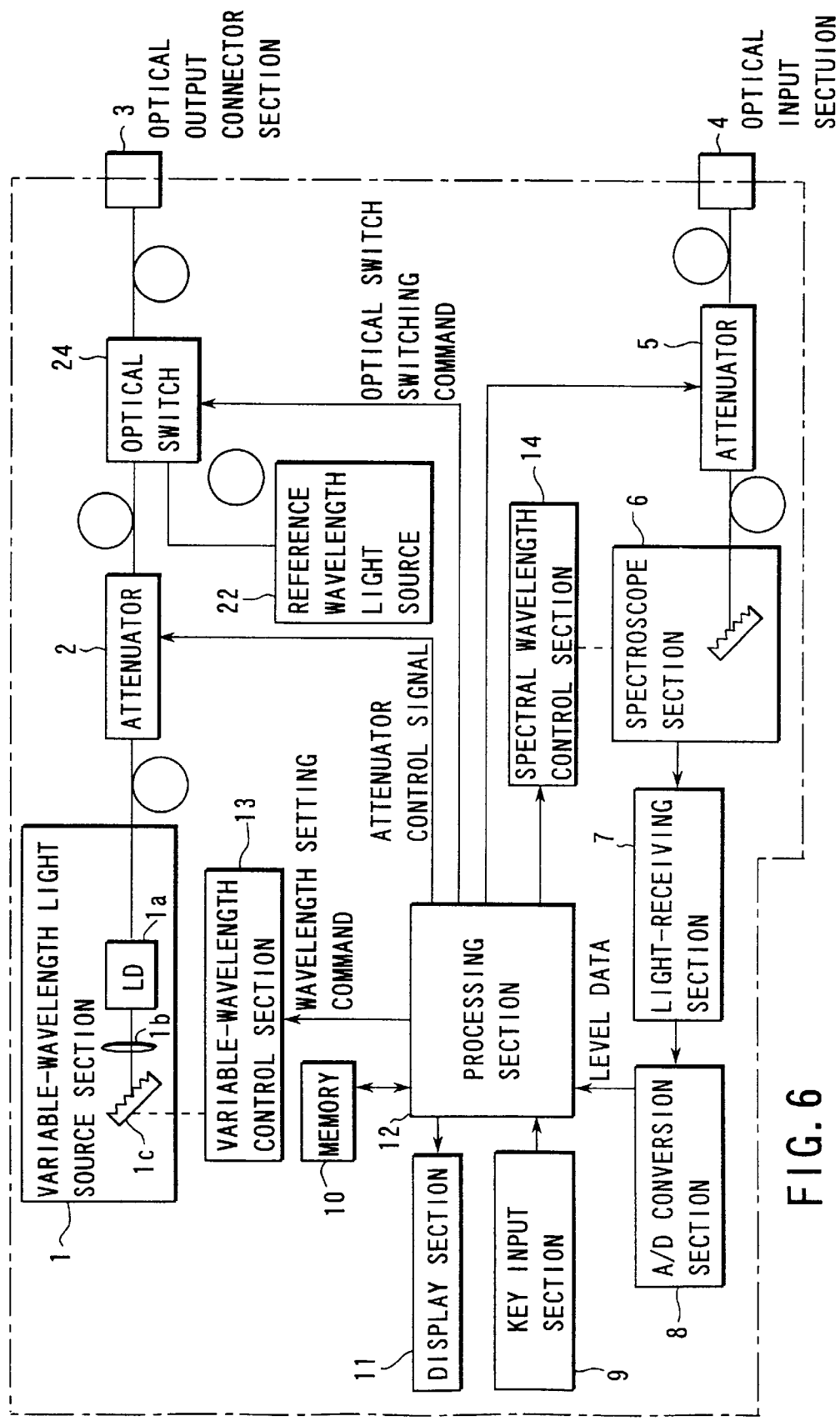
FIG. 6 is a block diagram showing an optical transmission characteristic measuring apparatus according to the fourth embodiment of the present invention.

FIG. 6 is a block diagram showing the optical transmission characteristic measuring apparatus according to the fourth embodiment of the present invention.

The same reference numerals in the fourth embodiment denote the same constituent elements as in the first embodiment, and a description thereof will be omitted.

As shown in FIG. 6, the optical transmission characteristic measuring apparatus of the fourth embodiment includes a reference wavelength light source 22 and an optical switch 24 in addition to the arrangement of the first embodiment.

The optical switch 24 as an optical switching means is arranged between a first attenuator 2 and an optical output connector section 3.

The optical switch 24 is controlled by a switching command from a processing section 12 to optically connect the reference wavelength light source 22 or the first attenuator 2 to the optical output connector section 3.

When the wavelength calibration process shown in FIG. 5 is to be executed, measurement is performed with output light from the reference wavelength light source 22 while the optical switch 24 is switched to the reference wavelength light source 22 side.

When a switching command is output from the processing section 12 to the optical switch 24 after this measurement is complete, the optical switch 24 is switched to the first attenuator 2 side, and measurement is performed with output light from a tunable-wavelength light source section 1.

According to the optical transmission characteristic measuring apparatus of the fourth embodiment, therefore, the optical switch 24 in the housing is used to connect either the tunable-wavelength light source section 1 or the reference wavelength light source 22 to the optical output connector section 3, thereby automatically executing a wavelength tuning process and a calibration process.

An optical transmission characteristic measuring apparatus according to the fifth embodiment of the present invention will be described next.

Figure 7:
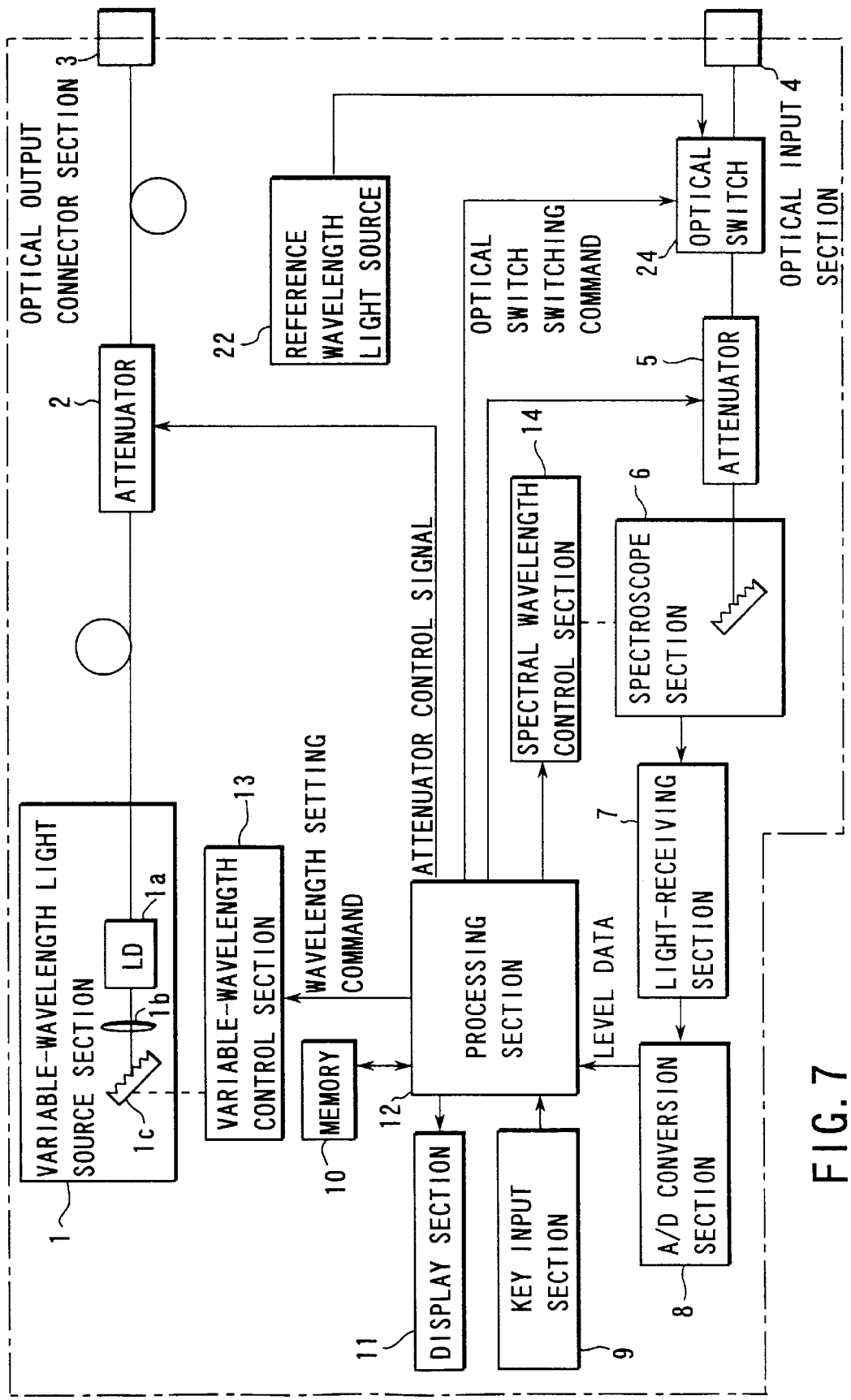
FIG. 7 is a block diagram showing an optical transmission characteristic measuring apparatus according to the fifth embodiment of the present invention.

FIG. 7 is a block diagram showing the optical transmission characteristic measuring apparatus according to the fifth embodiment of the present invention.

The same reference numerals in the fifth embodiment denote the same constituent elements as in the fourth embodiment, and a description thereof will be omitted.

As shown in FIG. 7, the optical transmission characteristic measuring apparatus of the fifth embodiment has the same arrangement as that of the fourth embodiment except that an optical switch 24 is arranged between an optical input connector section 4 and a second attenuator 5.

The optical switch 24 as an optical path switching means is controlled by a switching command from a processing section 12 to optically connect either a reference wavelength light source 22 or the second attenuator 5 to the optical input connector section 4.

When the calibration process shown in FIG. 5 is to be executed by the optical transmission characteristic measuring apparatus of the fifth embodiment, measurement is performed first with output light from the reference wavelength light source 22 while the optical switch 24 is switched to the reference wavelength light source 22 side.

When a switching command is output from the processing section 12 to the optical switch 24 after this measurement is complete, the optical switch 24 is switched to the second attenuator 5 side, and measurement is performed with output light from a tunable-wavelength light source section 1.

According to the above embodiments, the set wavelength of the tunable-wavelength light source section 1 is fixed, and wavelength tuning of the tunable-wavelength light source section 1 and the spectroscope section 6 is performed by performing a wavelength sweep operation on the spectroscope section 6 side. However, the set wavelength of the spectroscope section 6 may be fixed, and wavelength tuning may be performed by performing a wavelength sweep operation on the tunable-wavelength light source section 1 side.

In the above embodiments, the wavelength of the tunable-wavelength light source section 1 is calibrated to match with the reference wavelength λref. However, the level of output light from the tunable-wavelength light source section 1 may be calibrated after wavelength calibration.

A level calibration process in this case will be described by taking the arrangement in FIG. 4 as an example.

First of all, level measurement is performed by the reference wavelength light source 22 while the optical output connector section 23 of the reference wavelength light source 22 is connected to the optical input connector section 4 through a short fiber.

Level measurement is then performed by the tunable-wavelength light source section 1 while the optical output connector section 3 is connected to the optical input connector section 4 through a short fiber.

Upon completion of the above two level measurements, the processing section 12 obtains the difference between the two measured levels, and outputs a level calibration command corresponding to this difference to the tunable-wavelength light source section 1.

Upon reception of the level calibration command from the processing section 12, the tunable-wavelength light source section 1 changes the level of output light from the semiconductor laser element 1a or the attenuation amount of the first attenuator 2 to cancel out the measured level difference.

When the arrangement shown in FIG. 6 or 7 is used, the above operation is executed by controlling the optical switch 24.

As has been described above, according to the present invention, by setting a wavelength range, automatic measurement can be performed, and the optical transmission characteristics of various types of optical devices can be measured in a wide dynamic range.

In addition, according to the present invention, the following effects can be obtained.

In the optical transmission characteristic measuring apparatus of the present invention, since the polarized state of output light from the tunable-wavelength light source section is arbitrarily changed by the polarization control section, optical transmission characteristics in an arbitrary polarized state can be measured.

With this operation, wavelength loss/gain characteristics based on polarization caused by an object to be measured can be evaluated.

Furthermore, the optical transmission characteristic measuring apparatus of the present invention can improve wavelength accuracy and measure optical transmission characteristics by executing a wavelength tuning process and a wavelength calibration process.

In addition to these wavelength tuning process and wavelength calibration process, the apparatus can perform high-precision measurement with less errors by executing a level calibration process.

In the optical transmission characteristic measuring apparatus of the present invention, switching of the tunable-wavelength light source section and the reference wavelength light source with respect to the optical output section can be performed by the switching means, thereby allowing automatic execution of a wavelength tuning process and a calibration process.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An optical transmission characteristic measuring apparatus for measuring optical transmission characteristics of an optical device, comprising:

an external resonance type tunable-wavelength light source unit comprising a semiconductor laser element, an optical element and a diffraction grating, for variably setting a wavelength of an output light in a first wavelength range in accordance with a first wavelength range setting signal and inputting the output light to the optical device;

a spectroscope unit for variably setting a selected wavelength in a second wavelength range in accordance with a second wavelength range setting signal, and for performing spectroscopy of light passing through the optical device;

a light receiving unit for receiving the light having undergone spectroscopy in the spectroscopy unit and for photoelectrically converting the received light into a signal;

an A/D conversion unit for converting the signal produced by the light receiving unit into a digital signal;

an input unit for inputting wavelength information indicating a desired measurement wavelength range with respect to the optical device;

a memory unit for storing first wavelength setting data based on rotational angle data of the diffraction grating of the tunable-wavelength light source unit with respect to the wavelength of the output light, and second wavelength setting data on the selected wavelength employed by the spectroscope unit in advance;

a first tunable-wavelength control unit for controlling the diffraction grating of the tunable-wavelength light source unit using a predetermined range of the first wavelength setting data as the first wavelength setting signal, thereby variably controlling the wavelength of the output light from the tunable wavelength light source unit in the first wavelength range, said predetermined range of the wavelength setting data indicating the rotational angle data of the diffraction grating in the desired measurement wavelength range and being read out from the memory unit based on the wavelength information which indicates the desired measurement wavelength range;

a second tunable-wavelength control unit for controlling the spectroscope unit using a predetermined range of the second wavelength setting data of the spectroscope unit as the second wavelength setting signal, thereby variably controlling the selected wavelength of the spectroscope unit in the second wavelength range, said predetermined range of the wavelength setting data corresponding to the desired measurement wavelength range employed by the spectroscope unit and being read out from the memory unit based on the wavelength information which indicates the desired measurement wavelength range; and a processing unit for synchronously and variably controlling: (i) the predetermined range of the first wavelength setting data indicating data on the rotational angle of the diffraction grating of the tunable-wavelength light source unit in the desired measurement wavelength range and read out from the memory unit, and (ii) the predetermined range of the second wavelength setting data of the spectroscope unit in the desired measurement wavelength range, so that the wavelength of the output light of the tunable-wavelength light source unit and the selected wavelength of the spectroscope unit are variably set in an equal wavelength relationship in the first and second wavelength ranges, thereby performing wide dynamic range measurement of the optical transmission characteristics of the optical device in accordance with the digital signal from the A/D conversion unit.

2. An apparatus according to claim 1, further comprising:

a reference wavelength light source for outputting reference light having a known wavelength; and an optical switch for switching between the reference light output by said reference wavelength light source and the output light from said tunable-wavelength light source unit.

3. An apparatus according to claim 1, further comprising a polarization controller arranged between said tunable-wavelength light source unit and an optical output section for inputting the output light from said tunable-wavelength light source unit to the optical device so as to change a polarized state of the output light from said tunable-wavelength light source unit.

4. An apparatus according to claim 1, further comprising a polarization controller arranged between said tunable-wavelength light source unit and an optical output section for inputting the output light from said tunable-wavelength light source unit to the optical device so as to change a polarized state of the output light from said tunable-wavelength light source unit.

5. A method of calibrating said optical transmission characteristic measuring apparatus defined in claim 1, comprising:

setting a wavelength of the output light from said tunable-wavelength light source unit;

obtaining, from the output signal of said light receiving unit, a wavelength at a peak level of the light having undergone spectroscopy in said spectroscope unit by wavelength-sweeping the spectroscope unit in a wavelength range including the set wavelength;

causing said processing unit to obtain a wavelength difference between the set wavelength of said tunable-wavelength light source unit and the wavelength at the peak level;

causing said processing unit to obtain wavelength difference data with respect to one of said tunable-wavelength light source unit and said spectroscope unit which corresponds to the wavelength difference;

causing said processing unit to calibrate current wavelength setting data with the wavelength difference data; and wavelength-tuning said tunable-wavelength light source unit and said spectroscope unit by performing a wavelength tuning process using said data calibrated by said processing unit.

6. A method of calibrating said optical transmission characteristic measuring apparatus defined in claim 2, comprising:

setting a wavelength of the output light from said tunable-wavelength light source unit;

obtaining, from the output signal of said light receiving unit, a wavelength at a peak level of the light having undergone spectroscopy in said spectroscope unit by wavelength-sweeping the spectroscope unit in a wavelength range including the set wavelength;

causing said processing unit to obtain a wavelength difference between the set wavelength of said tunable-wavelength light source unit and the wavelength at the peak level;

causing said processing unit to obtain wavelength difference data with respect to one of said tunable-wavelength light source unit and said spectroscope unit which corresponds to the wavelength difference;

causing said processing unit to calibrate current wavelength setting data with the wavelength difference data; and wavelength-tuning said tunable-wavelength light source unit and said spectroscope unit by performing a wavelength tuning process using said data calibrated by said processing unit.

7. A method of calibrating said optical transmission characteristic measuring apparatus defined in claim 3, comprising:

setting a wavelength of the output light from said tunable-wavelength light source unit;

obtaining, from the output signal of said light receiving unit, a wavelength at a peak level of the light having undergone spectroscopy in said spectroscope unit by wavelength-sweeping the spectroscope unit in a wavelength range including the set wavelength;

causing said processing unit to obtain a wavelength difference between the set wavelength of said tunable-wavelength light source unit and the wavelength at the peak level;

causing said processing unit to obtain wavelength difference data with respect to one of said tunable-wavelength light source unit and said spectroscope unit which corresponds to the wavelength difference;

causing said processing unit to calibrate current wavelength setting data with the wavelength difference data; and wavelength-tuning said tunable-wavelength light source unit and said spectroscope unit by performing a wavelength tuning process using said data calibrated by said processing unit.

8. A method of calibrating said optical transmission characteristic measuring apparatus defined in claim 2, comprising:

obtaining, from the output signal of said light receiving unit, a wavelength at a peak level of the light having undergone spectroscopy in said spectroscope unit by wavelength-sweeping said spectroscope unit in a wavelength range including a wavelength of said reference wavelength light source;

causing said processing unit to obtain a wavelength difference between the wavelength at the peak level and the wavelength of said reference wavelength light source; and causing said processing unit to obtain wavelength difference data with respect to said spectroscope unit which corresponds to the wavelength difference.

9. A method of calibrating said optical transmission characteristic measuring apparatus defined in claim 3, comprising:

obtaining, from the output signal of said light receiving unit, a wavelength at a peak level of the light having undergone spectroscopy in said spectroscope unit by wavelength-sweeping said spectroscope unit in a wavelength range including a wavelength of said reference wavelength light source;

causing said processing unit to obtain a wavelength difference between the wavelength at the peak level and the wavelength of said reference wavelength light source; and causing said processing unit to obtain wavelength difference data with respect to said spectroscope unit which corresponds to the wavelength difference.

10. A method of calibrating said optical transmission characteristic measuring apparatus defined in claim 2, comprising:

inputting the reference light having a known level from said reference wavelength light source to said light receiving unit, and obtaining a level of the light having undergone spectroscopy in said spectroscope unit;

obtaining, from the output signal of said light receiving unit, a difference between the level of the light having undergone spectroscopy and the known level of said reference wavelength light source; and correcting a level of the output light from said tunable-wavelength light source unit so as to cancel out the level difference.

11. A method of calibrating said optical transmission characteristic measuring apparatus defined in claim 3, comprising:

inputting the reference light having a known level from said reference wavelength light source to said light receiving unit, and obtaining a level of the light having undergone spectroscopy in said spectroscope unit;

obtaining, from the output signal of said light receiving unit, a difference between the level of the light having undertone spectroscopy and the known level of said reference wavelength light source; and correcting a level of the output light from said tunable-wavelength light source unit so as to cancel out the level difference.

* * * * *